Feb. 15, 1966     R. G. MOORE, JR     3,234,740
GAS TURBINE LOAD SHARING SYSTEM
Filed July 5, 1963
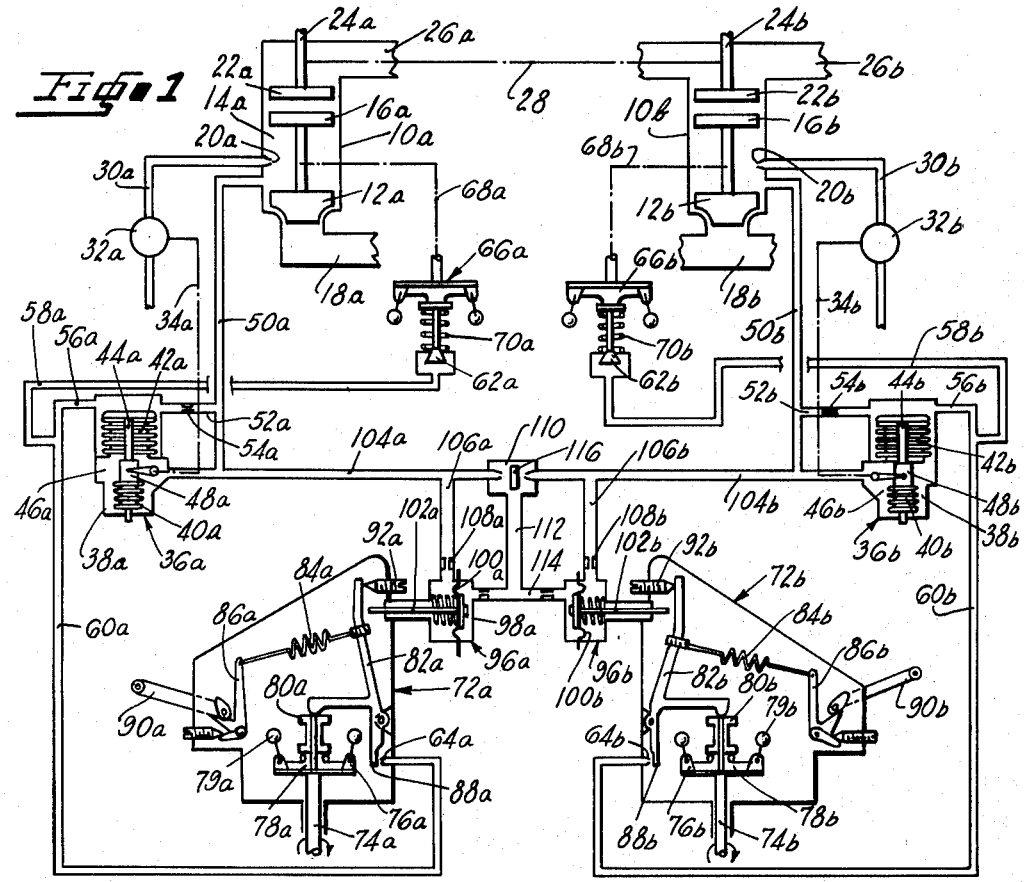
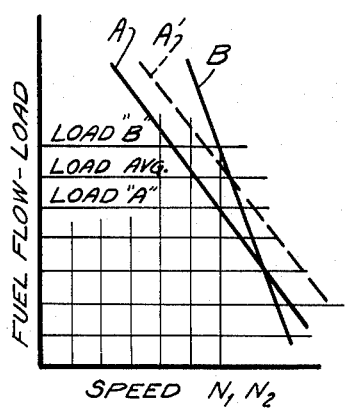
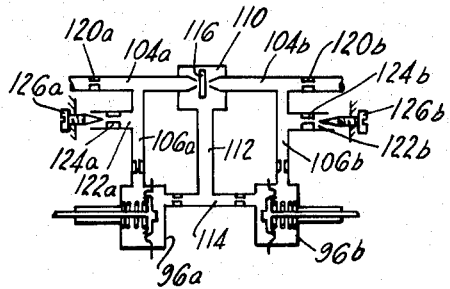
INVENTOR.
ROBERT G. MOORE JR
BY
William G. Thompson
ATTORNEY

United States Patent Office 3,234,740
Patented Feb. 15, 1966

3,234,740
GAS TURBINE LOAD SHARING SYSTEM
Robert G. Moore, Jr., South Bend, Ind., assignor to The Bendix Corporation, South Bend, Ind., a corporation of Delaware
Filed July 5, 1963, Ser. No. 292,976
4 Claims. (Cl. 60—97)

The present invention relates to a load sharing system for a plurality of gas turbine engines, particularly of the shaft output type hereinafter referred to as turbo-shaft engines. More particularly the invention provides means for resetting selected engine governors controlling selected engines within a bank of engines in response to load comparisons so that each engine will supply a substantially equal share of the overall power requirements.

The present invention is an improvement over copending U.S. Patent 3,159,000 issued December 1, 1964 filed in the name of Howard L. McCombs, Jr., and assigned to the same assignee with the present application.

In order to assure maximum power capability, uniformity of wear and/or deterioration and balance loading, it is desirable in many multiple power plant installations that each engine bear a substantially equal portion of the load.

When the engine outputs are not interconnected in a physical sense, the respective engine speed governors are able by small variations in speed between respective engines to make large compensating adjustments in engine load and thus maintain a close approach to load uniformity. However, for engines of a turbo-shaft type wherein the output shafts drive a common load and thus are physically connected one to another so as to rotate at equal speeds or at speeds having a fixed ratio one to another, it is no longer possible to correct for load inequities by relative speed variations between engines. Under this condition, certain engines within a bank driving a common load will assume greatly disproportionate shares of the overall load and relative corrections via speed adjustments is not possible since all speeds will vary in unison.

In the aforementioned copending patent of Howard L. McCombs, Jr. means were provided to vary the gain of selected governors in response to power comparisons between engines in such a direction that the under or low power producing engines will assume a greater proportion of the overall load to provide for equal load sharing between all engines. Varying governor gain, however, is obtained at the expense of reducing the sensitivity or response of the governor being adjusted which for many systems is considered undesirable.

Accordingly, it is an object of the present invention to provide a load sharing control system whereby adjustments to selected engines in a bank of engines driving a common load may be made by resetting the governor setting springs independent of the normal governor adjusting means to effect resetting of the governors without reducing sensitivity.

It is another object of the present invention to provide control means for comparing the load produced by each engine in a bank against the load supplied by the maximum producing engine and to reset the governor setting spring based on this comparison.

Other objects and advantages will become apparent on consideration of the following description and drawings wherein:

FIGURE 1 is a schematic drawing of a multiple turboshaft engine installation including fuel and load distribution control means in accordance with the teachings of the present invention;

FIGURE 2 is a graph illustrating governor slope characteristics of the individual engines of FIGURE 1 before and after adjustment by my load sharing control system; and FIGURE 3 is a schematic drawing of a modified portion of my load sharing control.

Referring in particular to FIGURE 1, there is shown a multiple engine installation consisting of a pair of turboshaft engines 10a and 10b of similar construction which will be described in connection with engine 10a. Engine 10a includes a gas producing section having a compressor 12a, a combustion chamber 14a, and a compressor driving turbine 16a. Air is received from an inlet manifold 18a, compressed in compressor 12a, burned with a fuel mixture supplied by a nozzle 20a in combustion chamber 14a to produce high energy content motive fluid or gases which pass through turbine 16a which extracts a portion of the energy content sufficient to drive the compressor. The engine further includes a power output section which receives the high energy content motive fluid from the gas producing section and converts this energy into a rotational shaft output. The power output section consists of an output turbine 22a drivably connected to output shaft 24a. Turbine 22a extracts substantially the balance of usable energy of the motive fluid and exhausts the spent gases to the exhaust manifold 26a. The identical parts of engine 10b bear the same numerical designation as those described for engine 10a except for the letter subscript.

The present invention has its greatest utility applied to a multiple power plant installation wherein the engines are driving a common load. The dash line 28 is representative of load interconnection which inhibits relative speed adjustments between shafts 24a and 24b. Fuel is supplied to engine 10a by means of fuel conduit 30a which includes an automatically adjustable fuel valve 32a for controlling the rate of fuel delivery. Valve 32a is controlled in position by a positioning signal supplied by a dash line connection 34a from fuel system 36a which is a pneumatic control of the type described and commonly assigned U.S. Patent 3,040,529, James E. Hurtle, inventor, and issued June 26, 1962. The pneumatic control consists of a housing 38a containing a small evacuated bellows 40a secured on one end wall at the lower end of housing 38a and a large open bellows 42a peripherally secured to the housing sidewalls to divide said housing into first chamber 44a and a second chamber 46a, the latter chamber containing bellows 40a. Bellows 42a and 40a have their movable ends interconnected by a rod 48a which is thereby moved axially in response to the sum or difference of pressure forces acting on the bellows. Rod 48a is connected via linkage 34a to metering valve 32a to transmit this motion thereto and effect variation on the fuel delivery.

Compressor discharge pressure is supplied by conduit 50a from the engine 10a to chamber 46a where it acts over the exterior surface of bellows 40a and the interior surface of bellows 42a. This pneumatic engine pressure is also supplied to chamber 44a via conduit 52a which includes the restriction 54a and which connects with source pressure conduit 50a. An exhaust conduit 56a is connected to chamber 44a and branches into two legs 58a and 60a, each of which terminate in a governor controlled exhaust valve 62a and 64a respectively. Exhaust valve 62a is controlled by an overspeed governor 66a driven by a connection 68a at a speed proportional to the gas producer section or turbine 16a and compressor 12a. Governor 66a operates against the force of a spring 70a to open exhaust valve 62a when gas producer speed exceeds a predetermined maximum safe value. Exhaust valve 64a is controlled by an all-speed or adjustable governor 72a adapted to be driven by engine shaft 24a by means of the rotating input shaft 74a. Governor 72a includes a pair of revolving pivots 76a attached to a rotating platform 78a which is secured to rotating shaft 74a. A pair of flyweights 79a are pivotally secured to pivots 76a to produce a force acting upwardly on a spindle 80a proportional to the speed of rotation. Spindle 80a bears against pivoted lever 82a which is urged counterclockwise against the action of flyweights 79a by a tension setting spring 84a having tension which is adjustable by means of throttle manipulated lever 86a. Pivoted lever 82a has a flapper valve portion 88a formed on its lower end which is operative with exhaust orifice 64a to control the degree of air being exhausted through conduit 60a. Governor 72a is operative to open exhaust valve 64a when the speed of turbine 22a approaches a value determined by the force of spring 84a. This speed value is adjustable to any desired value by throttle lever 90a.

The control system thus far described is in accordance with that of Patent 3,040,529 which contains a full description of the operation thereof and also is the same as the fuel system shown for engine 10b. Summerizing the operation, during engine acceleration, turbine 16a is below its limiting speed and turbine 22a below its requested speed so that both the exhaust valves 62a and 64a are closed. Under this condition there is no air flow through restriction 54a and consequently no pressure drop thereacross so that pressure in chamber 44a equals that in chamber 46a neutralizing bellows 42a. Compressor discharge pressure acting as bellows 40a is the effective force to position metering valve 32a in a gradually opening direction as engine acceleration proceeds and compressor pressure increases. As turbine 22a approaches a selected speed, governor 72a will urge exhaust valve 88a in an open direction causing flow through restriction 54a and a resulting pressure drop thereacross thus lowering the pressure in chamber 44a below that in chamber 46a. Decreasing pressure in chamber 44a causes large bellows 42a to become an effective controlling member opposing bellows 40a. Since bellows 42a is relatively large compared to bellows 40a and exhaust valve 88a is quite sensitive causing a large pressure drop across restriction 54a, bellows 42a becomes the predominant control overriding bellows 40a and causing fuel valve 32a to move in a fuel decreasing direction. Increase of speed of turbine 22a induces a decrease in fuel to provide an inverse relationship between speed and fuel required for dynamic governing. During deceleration, throttle 90a is retarded thus relaxing spring 84a. The engine will momentarily be at an overspeed condition with exhaust valve 88a in its wide open position against adjustable stop 92a. This causes a relatively fixed maximum pressure differential across bellows 42a which is subtractive from the force on bellows 40a which in net effect is equivalent to reducing the size of bellows 40a. Thus deceleration proceeds in substantially the reverse manner of an acceleration, except of course, at a much lower fuel value due to the decreased effectiveness of bellows 40a.

In order to provide means for adjusting the governor independent of throttle 90a, I have provided a reset mechanism 96a operative with spring 84a to reset governor 72a. The reset mechanism is comprised of a housing 98a which contains a spring loaded diaphragm member 100a and a longitudinally extending poker rod 102a which extends within the housing of governor 72a in close proximity to pivoted lever 82a. Diaphragm 100a and poker 102a are normally spring urged in a direction out of engagement with the pivoted lever 82a. As poker 102a is urged to the left in response to pressure forces acting on diaphragm 100a, it contacts pivoted lever 82a applying a force thereto which is additive to the setting force of selecting spring 84a and has the effect of increasing the governor setting speed without adjustment of throttle 90a.

Actuation of diaphragm 100a is by means of compressor discharge pressure transmitted from source conduit 50a through branch conduits 104a and 106a and fixed restriction 108a where it enters reset housing 98a and acts on the leftward facing face of diaphragm 100a. The rightward extending face of diaphragm 100a is exposed to the maximum compressor discharge pressure in the bank of engines which is supplied by means of selecting valve 110 through conduits 112 and 114. Selecting valve 110 is connected at the terminal ends to conduits 104a and 104b which contain compressor discharge pressure from engines 10a and 10b respectively. Conduits 104a and 104b terminate within selector valve housing in opposed facing nozzles between which is inserted a valve plate 116 loosely spaced. When pressure in conduit 104a exceeds that in conduit 104b, valve plate 116 moves to the right closing conduit 104b and venting compressor discharge pressure of engine 10a to conduit 112 and 114. Should the pressure in engine 10b be greater, valve plate 116 will move to the left closing conduit 104a venting compressor discharge pressure of engine 10b to conduit 112. Thus valve 116 selects the greater of the compressor discharge pressures of engines 10a and 10b and supplies this pressure to conduit 112.

For consideration of the operation of my load sharing system, reference is made to the graph of FIGURE 2 showing two randomly oriented governor slope curves A and B for each of the respective engines 10a and 10b. The variations between governor curves results from differences in manufacturing tolerances between engines and controls that exists in even the most closely controlled conditions. Assuming both engines are driving in common load at equal speeds $N_1$, the intersection of a vertical line drawn from $N_1$ with the governor curves indicates the fuel delivery and approximate load for each engine without load sharing. As shown there is a greatly disproportionate load distribution with engine 10b assuming a greater than average share whereas engine 10a is underproducing.

However, corrective adjustments are applied to the respective engine governing systems by my load sharing control which has the effect of equally distributing the load as described hereinafter.

In the bank of engines described above, compressor discharge pressure of engine 10b will be greater than that of engine 10a in close proportion to the load distribution between engines. Accordingly, selector valve 110 will supply compressor discharge pressure of engine 10b to the right face of diaphragm 100a of reset mechanism 98a. This causes a pressure differential across diaphragm 100a urging it to the left where it applies a force to pivoted lever 82a tending to close exhaust valve 88a which through bellows 42a causes a fuel flow increase, increasing the power delivered by engine 10a and increasing the balance between engines. The force applied to pivoted lever 82a has the effect of shifting governor curve A to the right as indicated by the dashed line curve of FIGURE 2. A new governor slope curve A' for engine 10a will be produced which is generally parallel with the governor curve A but displaced in an increasing speed direction therefrom. Turbines 22a and 22b will assume a new speed $N_2$ wherein the governor curves A' and B intersect and each engine is producing an equal load share. If after correction it is desired to run at speed $N_1$, the throttle levers 90a and 90b may be uniformly retarded to restore the original speed.

In the present invention compressor discharge pressure has been selected as a preferred engine parameter for indirectly measuring relative engine power. Particularly, when combined with pneumatic fuel control the type described herein, it will be observed that no separate power sensing equipment is required, but rather this measurement may simply be tapped from an existing control sensing conduit 50a and 50b and thus for the application described is the most economic means for sensing relative power. Other engine parameters lend themselves to producing relative power comparisons with varying degrees of accuracy, response and complexity. For installations having engine output shafts driving the same speed, a torque measurement on the output shaft may be utilized as a power comparison. The temperature drop across turbine 22a varies proportionally with power as does the speed of turbine 16a although with less accuracy. It is expected that those practicing the present invention may select the most suitable parameters based on cost and accuracy considerations as a power index without departing from the present invention.

In the load sharing system so far disclosed in connection with FIGURE 1 the assumptions have been made that engines 10a and 10b are of the same model or type, they are in the same state of wear or deterioration, very little variation of manufacturing tolerances exist, and are operating in the same environment so that each has nearly the same compressor discharge pressure for a given power output. When these conditions do not exist, it is possible that a given power output for each engine will result in different compressor discharge pressure condition and thus introduce a system error. To compensate for this error I have illustrated in FIGURE 3 a modification whereby I have included a manually adjustable trimming mechanism for correcting inequities in the relationship between power and compressor discharge pressure. The modification consists of the addition of a fixed bleed or restriction 120a to conduit 104a upstream of its connection with passage 106a. Downstream of fixed restriction 120a an exhaust vent passage 122a is provided connected to passage 106a and contains a restriction 124a which is manually adjustable by means of screw valve 126a. If now engines 10a and 10b when producing the same power output have different compressor discharge pressures, an adjustment on screw valve 126a can be made to bring the pressures into balance before these pressures are applied to the reset devices. For example, if the pressure from engine 10a is greater than from engine 10b, screw valve 126a is adjusted away from restriction 124a causing the pressure downstream of fixed restriction 120a to decrease. When adjustment has proceeded so that both pressure and loads are balanced the system would be adjusted and operate in the manner previously described. For greater flexibility a complementary adjustment is provided in passages 104b and 106b so that adjustment may be made in either pressure circuit or both. If the engines deteriorate unequally, periodic adjustments may be made to maintain balanced loading.

It will also be noted that screw valves 126a and 126b could be adjusted to purposely introduce a fixed ratio load unbalance between engines if this were desired. For example, if one engine were in an advanced stage of deterioration compared to other engines within a bank and economics dictated that the life of this engine be stretched, this may be readily accomplished by adjusting its screw valve in relation to those of other engines to purposely render it underproducing by a fixed ratio.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will occur to those skilled in the art within the spirit of the invention and the scope of the appended claims.

I claim:

1. A load sharing system for a bank of two or more turbo-shaft engines each having an output shaft driving a common load, said load sharing system comprising: a governor device for each engine for controlling fuel delivery thereto; each of said governors including speed responsive flyweights and a speed setting spring in opposed force relation; each of said flyweights being connected to the output shaft of its associated engine to rotate in proportion to output shaft speed; reset means for each governor device operative to adjust the force relation between said flyweights and said setting spring for its respective governor, each of said reset means being responsive to a power comparison between the power produced by its associated engine to that produced by the maximum producing engine within said bank of engines, said reset means operative to adjust said force relation in proportion to said power comparison.

2. A load sharing system for a bank of two or more turbo-shaft engines each having an output shaft driving a common load, said load sharing system comprising: a governor device for each engine for controlling fuel delivery thereto; each of said governors including speed responsive flyweights and a setting spring in opposed force relation; said flyweights being connected to the output shaft of its associated engine to rotate in proportion to output shaft speed; reset means for each governor device operative to adjust said speed setting spring and alter the controlled speed of its associated governor; each of said reset means being responsive to a power comparison between the power produced by its associated engine to that produced by the maximum producing engine within said bank of engines, said reset means operative to adjust said speed setting spring in a direction to call for a speed increase in proportion to said power comparison.

3. A load sharing system for a bank of two or more turbo-shaft engines each having a compressor section and an output shaft driving a common load, said load sharing system comprising: a governor device for each engine for controlling fuel delivery thereto; each of said governors including speed responsive flyweights and a speed setting spring in opposed force relation; said flyweights being connected to the output shaft of its associated engine to rotate in proportion to output shaft speed; reset means for each governor device operative to adjust said speed setting spring and alter the controlled speed of its associated governor; each of said reset means including a pressure responsive member; conduit means for each engine sensing a pressure generated within said compressor section, each of said conduit means being connected to its associated reset means to provide compressor generated pressure to one side of said pressure responsive member; selecting means connected to said conduit means for selecting the maximum compressor generated pressure from said bank of engines; said selecting means connected to each of said reset means to provide the maximum compressor pressure from said bank of engines to the other side of said pressure responsive member; said reset means operative to adjust said speed setting spring in proportion to the difference in compressor pressure developed in its associated engine to the maximum produced in said bank of engines.

4. A load sharing system for a bank of two or more turbo-shaft engines each having a compressor section and an output shaft driving a common load, said load sharing system comprising: a governor device for each engine for controlling fuel delivery thereto; each of said governors including speed responsive flyweights and a speed setting spring in opposed force relation; said flyweights being connected to the output shaft of its associated engine to rotate in proportion to output shaft speed; reset means for each governor device operative to adjust said speed setting spring and alter the controlled speed of its associated governor; each of said reset means including a pressure responsive member; conduit means for each engine sensing a pressure generated with said compressor section; each of said conduit means being connected to its associated reset means to provide compressor generated pressure to one side of said pressure responsive member; adjusting means operative with said conduit means to selectively adjust the compressor generated pressure acting on said pressure responsive member so that said compressor generated pressure is a relative measurement of engine power regardless of different engine pressure to power characteristics; selecting means connected to said conduit means for selecting the maximum compressor generated pressure from said bank of engines; said selecting means connected to each of said reset means to provide the maximum compressor pressure from said bank of engines to the other side of said pressure responsive member; said reset means operative to adjust said speed setting spring in proportion to the difference in compressor pressure developed in its associated engine to the maximum produced in said bank of engines.

References Cited by the Examiner
UNITED STATES PATENTS 3,152,444  10/1964  Peczkowski et al. ___ 60—39.16
3,159,000  12/1964  McCombs _____ 60—39.15

SAMUEL LEVINE, *Primary Examiner.*

ROBERT R. BUNEVICH, *Examiner.*